United States Patent [19]

Smith

[11] Patent Number: 4,855,328

[45] Date of Patent: Aug. 8, 1989

[54] METHOD FOR REDUCING SILICONE FOAM DENSITY

[75] Inventor: Kennith A. Smith, Clifton Park, N.Y.

[73] Assignee: The John Hopkins University, Baltimore, Md.

[21] Appl. No.: 261,548

[22] Filed: Oct. 24, 1988

[51] Int. Cl.$^4$ .............................................. C08J 9/02
[52] U.S. Cl. ........................................ 521/88; 521/92; 521/134; 521/154
[58] Field of Search .................... 521/88, 92, 134, 154

[56] References Cited

U.S. PATENT DOCUMENTS

| | | |
|---|---|---|
| 4,593,049 | 6/1986 | Bauman et al. ..................... 521/154 |
| 4,608,396 | 8/1986 | Bauman et al. ..................... 521/154 |
| 4,760,098 | 7/1988 | Miutel ................................. 521/154 |
| 4,767,794 | 8/1988 | Modic et al. ....................... 521/154 |
| 4,808,634 | 2/1989 | Uriarte et al. ..................... 521/154 |

*Primary Examiner*—Morton Foelak
*Attorney, Agent, or Firm*—Robert E. Archibald; Howard W. Califano

[57] ABSTRACT

Silicone foams having a reduced density can be made by cooling the foam components of vinyl-terminated polydiorganosiloxane, methylhydrogenpolysiloxane, hydroxylated material, such as water and platinum catalysts, and mixing and maintaining the foamable mixture at a temperature of less than 5° C.

5 Claims, No Drawings

METHOD FOR REDUCING SILICONE FOAM DENSITY

BACKGROUND OF THE INVENTION

The present invention relates to a method of reducing the density of silicone foam resulting from the platinum-catalyzed generation of hydrogen as. More particularly, the present invention relates to a method for making silicone foam at a reduced density by cooling the foam components prior to mixing to a temperature of up to 5° C. and thereafter maintaining the foamable mixture at a reduced temperature.

Elastomeric silicone foams have been used in a variety of applications such as thermo- and electricalinsulators, foam barriers, and cushions. Even though elastomeric silicone foams are superior to organic foams in many instances, organic foams are often used based on economic consideration.

At the present time, commercially available silicone foam has a foam density which can provide a 15–25 pound/cubic ft. foam structure. One method of reducing the cost of elastomeric silicone foam, is to reduce foam density without altering the desirable physical properties of the foam material.

Although silicone foam may be made by using a blowing agent, or even mechanical mixing, another technique is by effecting the generation of hydrogen gas using a platinum catalyst as shown by Smith, U.S. Pat. No. 3,923,705. Elastomeric silicone foams can be made by forming a mixture of a silanol, a silicone hydride, and a vinyl-containing silicone in the presence of a platinum catalyst. There is effected the simultaneous generation of hydrogen gas along with cross-linking. For example, Modic, U.S. Pat. No. 4,189,545, incorporated herein by reference produces silicone foam by adding water to a composition of a vinyl-containing siloxane, a hydride-containing siloxane and platinum to generate hydrogen simultaneously with cross-linking. Modic, U.S. Pat. No. 4,418,157 shows the strengthening of silicone foam by adding a resinous copolymer, while Bauman et al., U.S. Pat. No. 4,599,367 reduces silicone foam density by using a combination of silanol and water.

The present invention is based on the discovery that a substantial reduction in silicone foam density can be achieved, if the silicon foam components are initially cooled prior to mixing. The resulting foamable mixture, upon blending of the components, also can be cooled to provide a significant density reduction.

STATEMENT OF THE INVENTION

There is provided by the present invention a method for lowering the density of silicone foams resulting from the interaction of ingredients in a foamable mixture comprising an (A) component comprising an effective amount of platinum catalyst, a hydroxylated material and a vinyl-terminated polydiorganosiloxane and a (B) component comprising an organohydrogen polysiloxane, which method comprises, (1) agitating a mixture of the (A) component and the (B) component at a temperature of −20° C. to 5° C., and (2) allowing the mixture of (1) to foam while the temperature of the mixture is maintained at −20° C. to 5° C.

A typical foamable composition comprises by weight, (A) 100 parts of a vinyl-terminated polydiorganosiloxane,
(B) 0.5–50 parts of a hydride polysiloxane
(C) 0.2–10 parts of a hydroxylated material and
(D) an effective amount of a platinum catalyst.

There can be used as the vinyl-terminated polydiorganosiloxane, polydiorganosiloxane fluids having a viscosity from about 100 to about 1,000,000 centipoise at 25° C., and preferably from about 2500 to 500,000 centipoise. The vinyl-substitution in the vinyl-terminated polydiorganosiloxane can range of from about 0.0002 to 3% by weight, and preferably from about 0.001 to about 1% by weight of vinyl-terminated polydiorganosiloxane. The vinyl-terminated polydiorganosiloxane is preferably terminated with vinyl-diorganosiloxy units, and the organo radicals of the vinylterminated polydiorganosiloxane are selected from $C_{(1-20)}$ monovalent hydrocarbon radicals or $C_{(1-20)}$ monovalent hydrocarbon radicals substituted with radicals inert during equilibration.

There are included by the organo radicals of the vinyl-terminated polydiorganosiloxane, alkyl radicals such as methyl, ethyl, propyl, etc.; cycloalkyl radicals, such as cyclohexyl, cycloheptyl, etc.; haloalkyl radicals such as trifluoropropyl; aryl radicals, for example, phenyl, tolyl, xylyl, naphthyl; haloaryl radicals such as chlorophenyl, nitrotolyl, nitrophenyl, etc.; alkenyl radicals such as vinyl, allyl. It is preferred that the organo radicals are selected from methyl, phenyl, vinyl, and 3,3,3-trifluoropropyl.

The vinyl-terminated polydiorganosiloxanes are well-known in the art and can be made, for example, by equilibrating cyclic polydiorganosiloxanes with or without vinyl substitution in the presence of appropriate amount of a vinyl chain-stopper such as a 1,3-divinyl tetraorganodisiloxane. Further details for making vinyl-substituted polydiorganosiloxanes can be found in Modic, U.S. Pat. 3,425,967 incorporated herein by reference.

A preferred form of the hydride polysiloxane which can be used in the practice of the present invention consists essentially of a mixture of a linear hydride polysiloxane having the formula,

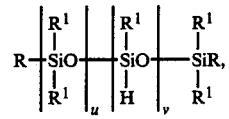

and a cyclic hydride polysiloxane having the formula,

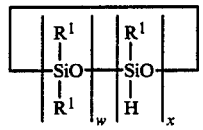

where R is a member selected from the class consisting of hydrogen, $C_{(1-8)}$ alkyl radicals, $C_{(1-8)}$ halo substituted alkyl radicals, $C_{(6-14)}$ aryl radicals, and halo substituted $C_{(6-14)}$ aryl radicals, $R^1$ is a member selected from the class consisting of $C_{(1-8)}$ alkyl radicals, $C_{(6-14)}$ aryl radicals, $C_{(6-14)}$ halo aryl radicals and $C_{(3-8)}$ fluoroalkyl radicals, u and v are integers which can vary sufficiently to provide a hydride polysiloxane having a viscosity of from about 5 to about 10,000 centipoise at 25° C., w is an integer having a value of 0 to 5 inclusive, x is an integer having a value of from 1 to 8 inclusive and the sum of w and x has a value of from 3 to 8 inclusive. Preferably, the hydride polysiloxane consists essentially of chemically combined organosiloxy units having silicon-bonded hydrogen atoms attached to silicon to form the polysiloxane chain backbone. Preferably the cyclic hydride polysiloxane is a mixture of cyclic hydride polysiloxane within the above formula. Additional hydride polysiloxanes which can be used in the practice of the invention are shown by Modic, U.S. Pat. No. 4,189,545 and Polmanteer et al., U.S. Pat. No. 3,697,473.

In addition to the hydride polysiloxane, the silicone foam composition of the present invention requires a source of hydroxy radicals in the form of a hydroxylated material. The hydroxylated material which has been found to be effective is an aqueous mixture of a $C_{(1-8)}$ alkanol such as methanol, ethanol, propanol, butanol, pentanol. Preferably, an aqueous mixture of methanol and water has been found to provide optimum results. In addition to an aqueous alkanol mixture, hydroxylated silicones such as silanols in the form of homopolymers, copolymers, and mixture thereof, also can be used.

Platinum catalysts which can be used in the practice of the present invention in making the silicone foam compositions are, for example, reaction products of an olefin and chloro platinic acid as described in Ashby, U.S. Pat. No. 3,159,601, or the reaction product of platinic chloride and cyclopropane as described in Ashby, U.S. Pat. No. 3,159,662. Further platinum complexes which can be used as the platinum catalyst are reaction products of chloroplatinic acid with up to 2 moles, per gram of platinum of a member selected from the class consisting of alcohols, ethers, aldehydes and mixtures thereof, as shown in Lamoreaux, U.S. Pat. No. 3,220,972. The preferred platinum catalyst is shown by Karstedt, U.S. Pat. No. 3,775,452, which is formed by reacting chloroplatinic acid with tetramethyldivinyldisiloxane in the presence of sodium bicarbonate in an ethanol solution. It has been found that effective results can be achieved if sufficient platinum catalyst is employed in the silicone foamable composition to provide from 1 to 250 parts per million of platinum, preferably from 1 to 200 parts of platinum per million parts of mixture.

In addition to the aforementioned basic ingredients, the silicone foam composition can contain from 1 to 200 parts by weight of a filler, per hundred parts of foam composition. It is preferred to use extending fillers or reinforcing fillers such as fumed silica, precipitated silica also can be used in instances where it is desired to increase the physical properties such as the tensile strength and tear strength of the resulting elastomeric silicone foam. Other extending fillers which may be utilized are, for example, titanium dioxide, lithopone, zinc oxide, zirconium silicate, silica airogel, iron oxide, diatomaceous earth, calcium carbonate, glass fibers, magnesium oxide, chromic oxide, zirconium oxide, aluminum oxide, α-quartz, clay, carbon, and graphite. In order to minimize the viscosity increase generally experienced when using reinforcing fillers, the reinforcing fillers can be heat treated with cyclic polysiloxanes or silazanes. A preferred filler in the practice of the present invention is ground quartz which has been found to enhance the burn- resistant properties of the composition as well as imparting some enhanced physical properties to the final cured silicone foam.

The silicone foam compositions of the present invention are generally used and stored as a two-part composition. The platinum catalyst is preferably incorporated in the vinyl-containing polysiloxane. Hydroxylated material also can be added to the vinyl-containing polysiloxane along with the filler.

In forming the silicone foam, the hydride polysiloxane (Part B) is rapidly mixed with the vinyl-containing siloxane (Part A) containing the hydroxylated material and platinum catalyst. The resulting composition can be poured into a cavity and allowed to stand. The composition thereafter will begin to cross-link and generate gas simultaneously resulting in a cured elastomeric silicone foam having a density of less than 20 pounds per cubic foot.

If desired, an inhibitor, such as diallylmaleate or methylethylketone peroxide, or dimethylacetylenedicarboxylate, can be added to the compositions at a concentration of anywhere from 100 parts to 10,000 parts, per million parts based on total composition to increase the worklife of the curable silicone mixture.

In addition to the aforementioned silica fillers, there also can be used additional additives such as carbon black, pigment, glass fibers, etc. In addition, additives such as MQ or MQD resins can be added to lower density, increase strength as described in U.S. Pat. No. 4,418,157, incorporated herein by reference.

In order that those skilled in the art will be better able to practice the present invention, the following examples are given by way of illustration and not by way of limitation. All parts are by weight.

EXAMPLE 1

A mixture of 20 grams of a blend (Part A) containing 39% by weight of a polydimethylsiloxane having terminal dimethylvinylsiloxy units and a viscosity of about 75,000 centistokes, 15% by weight of a polydimethylsiloxane having terminal dimethylvinylsiloxy units and a viscosity of 4000 centistokes, 18% by weight of a methylsiloxane resin consisting essentially of chemically combined $SiO_2$ and a ratio of 1.43 moles of trimethylsiloxy units, per 0.25 mole of methylvinylsiloxy units, 25% by weight of α-quartz, 2% by weight of calcium carbonate, 1.5% by weight of water, and 20 to 50 parts per million of platinum in the form of a platinum vinyl siloxane complex was blended for 1-2 minutes using a stainless steel spatula. The mixture was cooled in an ice bath over a period of 30 minutes until the temperature was 3°-5° C.

Two grams of a linear hydride polysiloxane (Part B) having terminal trimethylsiloxy units and consisting essentially of methyl hydrogen siloxy units having a viscosity of about 3000-5000 centistokes was also cooled to 3°-5° C.

Part A and Part B were vigorously mixed for 30 seconds and then transferred to a pre-weighed container which was maintained at a temperature below 5° C. Foaming occurred in the resulting mixed blend and gel times were determined by observing when the foam remaining in the container had jelled sufficiently to snap back when stretched out with a spatula. The resulting foam had a density of 13.4 lb./cm.-ft.

The same procedure was repeated, except the formulation was processed at room temperature. The foam density was found to be 17.2 lb./cm.-ft.

EXAMPLE 2

The procedure of Example 1 was repeated except of 50% by weight of a linear poly(methylhydrogen)siloxane cally-combined siloxy units and 50% by weight of a cyclic methylhydrogentetrasiloxane was substituted for Part B. The density of the resulting foam processed at room temperature was 11.2 lb./cm.-ft., while the density of the foam obtained with Part A and Part B components cooled to less than 5° C. was 7.0 lb./cm.-ft.

It was further found that the lower temperature resulted in foams having cure times of 20 to 30 minutes. The cell size of the foam processed at lower temperatures were also found to be larger. In instances where smaller cell size is desired, there can be added polyfunctional alcohol, such as butane diol or ethylene glycol at 1-1.5% by weight of the foam composition, or a fluorinated alcohol at up to 5% by weight as shown by U.S. Pat. No. 4,574,149.

Although the above examples are directed to only a few of the very many variables which can be used in practicing the method of the invention, it should be understood that the present invention is directed to the use of a much broader variety of components and conditions as shown in the description preceding these examples.

What is claimed is:

1. A method for lowering the density of silicone foams resulting from the interaction of ingredients in a foamable mixture comprising an (A) component comprising an effective amount of platinum catalyst, a hydroxylated material and a vinyl-terminated polydiorganosiloxane and a (B) component comprising an organohydrogen polysiloxane, which method comprises,
   (1) agitating a mixture of the (A) component and the (B) component at a temperature of $-20°$ C. to 5° C., and
   (2) allowing the mixture of (1) to foam while the temperature of the mixture is maintained at $-20°$ C. to 5° C.

2. A method in accordance with claim 1, where the vinyl terminated polydiorganosiloxane is a vinyl terminated polydimethylsiloxane.

3. A method in accordance with claim 1, where the hydroxylated material is a mixture of methanol and water.

4. A method in accordance with claim 1, where the platinum catalyst is a platinum vinyldisiloxane.

5. A method in accordance with claim 1, where the cyclic hydride polysiloxane is a hydride cyclotetrasiloxane.

* * * * *

UNITED STATES PATENT AND TRADEMARK OFFICE
CERTIFICATE OF CORRECTION

PATENT NO. : 4,855,328

DATED : August 8, 1989

INVENTOR(S) : Smith

It is certified that error appears in the above-identified patent and that said Letters Patent is hereby corrected as shown below:

Title page, item [73] assignee, delete "The John Hopkins University, Baltimore, Md." and insert --General Electric Company, New York, NY--.

Title page, Attorney, Agent or Firm: delete "Robert E. Archibald; Howard W. Califano and insert --William A. Teoli, james C. Davis, Jr. and William H. Pittman--.

Signed and Sealed this

Twenty-sixth Day of June, 1990

*Attest:*

HARRY F. MANBECK, JR.

*Attesting Officer*  *Commissioner of Patents and Trademarks*